(12) United States Patent
Petralia

(10) Patent No.: US 11,490,717 B2
(45) Date of Patent: Nov. 8, 2022

(54) WRIST STRAP ASSEMBLY FOR A MOBILE DEVICE

(71) Applicant: Jason P. Petralia, Greenfield Center, NY (US)

(72) Inventor: Jason P. Petralia, Greenfield Center, NY (US)

(*) Notice: Subject to any disclaimer, the term of this patent is extended or adjusted under 35 U.S.C. 154(b) by 270 days.

(21) Appl. No.: 17/085,800

(22) Filed: Oct. 30, 2020

(65) Prior Publication Data

US 2022/0133019 A1    May 5, 2022

(51) Int. Cl.
*A45F 5/00* (2006.01)
*H04B 1/3888* (2015.01)
*A45C 11/00* (2006.01)

(52) U.S. Cl.
CPC ........... *A45F 5/00* (2013.01); *A45C 11/00* (2013.01); *H04B 1/3888* (2013.01); *A45C 2011/002* (2013.01); *A45F 2005/006* (2013.01); *A45F 2005/008* (2013.01); *A45F 2200/0516* (2013.01)

(58) Field of Classification Search
CPC ........... A45F 5/00; A45F 2005/008; A45F 2005/1013; A45F 2005/006; A45F 2005/22; A45F 2005/0516; A45F 2005/0525; A45C 2011/002; A45C 2011/003; H04B 1/3888
See application file for complete search history.

(56) References Cited

U.S. PATENT DOCUMENTS

| 6,595,703 | B1* | 7/2003 | Laituri | A45C 13/30 396/423 |
| 6,662,986 | B2* | 12/2003 | Lehtonen | A45F 5/02 224/675 |
| 9,532,639 | B2* | 1/2017 | Kimble | A45F 5/00 |
| 10,171,639 | B2* | 1/2019 | Hu | H04M 1/04 |
| 10,447,831 | B2* | 10/2019 | Roncetti | H04B 1/3888 |
| 11,388,979 | B2* | 7/2022 | Shaw | A45C 11/00 |
| 11,405,067 | B2* | 8/2022 | Sung | A45F 5/10 |
| 2011/0309117 | A1* | 12/2011 | Roberts | H04M 1/04 224/217 |
| 2013/0240380 | A1* | 9/2013 | Hansen | A45F 5/00 206/37 |
| 2022/0133019 | A1* | 5/2022 | Petralia | A45F 5/00 224/220 |

* cited by examiner

*Primary Examiner* — Justin M Larson
(74) *Attorney, Agent, or Firm* — Heslin Rothenberg Farley & Mesiti, P.C.

(57) ABSTRACT

A wrist strap assembly for a mobile device includes a case and a wrist strap. The case includes a bottom wall. A sidewall is disposed around a perimeter of the bottom wall and extends from the bottom wall to an upper distal end of the sidewall. The sidewall and bottom wall define an inner cavity sized to receive a mobile device therein. A channel is disposed around the upper distal end of the sidewall. The wrist strap is configured to have a stored position and a deployed position. When the wrist strap is in the stored position, the wrist strap is configured to frictionally fit within the channel of the case. When the wrist strap is in the deployed position, the wrist strap is configured to fit around the wrist of a user and to be connected to the case to secure the case to the user's wrist.

18 Claims, 5 Drawing Sheets

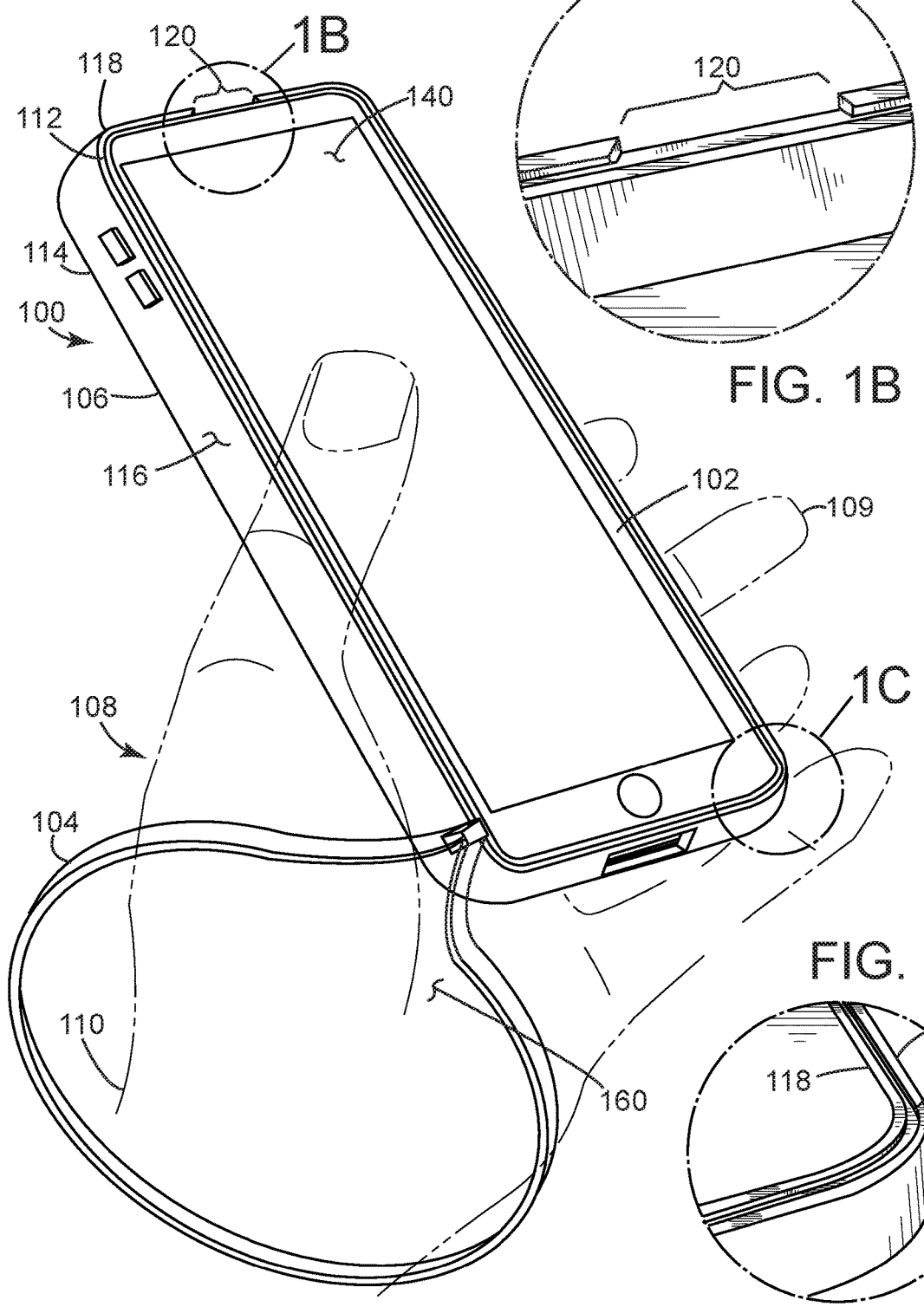

WRIST STRAP ASSEMBLY FOR A MOBILE DEVICE

TECHNICAL FIELD

The present disclosure relates to mobile device attachments and cases. More specifically, the disclosure relates to wrist strap assemblies for mobile devices.

BACKGROUND

Mobile devices, such as mobile cell phones, are ubiquitous in current society. The advent of smart devices and touch screens have made mobile devices more and more susceptible to damage through unintentional ground impact when a user accidentally drops his or her mobile device. As a result, costly repairs to, or replacement of, a user's mobile device is a common occurrence after one or more such events. Further, mobile devices may accidentally be dropped into an environment (body of water, storm drains, etc.), wherein the mobile device (and protective case) is lost and must be replaced at significant expense and trouble.

Accessories such as protective cases protect mobile devices from damage due to accidental droppage. However, often times the mobile device graphical user interface (GUI), such as a touch screen, is left unprotected by a protective case and the electronic circuitry within the mobile device may still be damaged by the force of ground impact.

Accordingly, there is a need for an accessory to mobile devices that can prevent a mobile device from being dropped or lost even when a user loses his or her grip on the mobile device. Additionally, there is a need for an accessory to further protect the screen of a mobile device upon impact of the mobile device with the ground, if the mobile device were to be inadvertently dropped.

BRIEF DESCRIPTION

The present disclosure offers advantages and alternatives over the prior art by providing a wrist strap assembly for a mobile device. The wrist strap assembly includes a mobile device case and a wrist strap attachable thereto. The wrist strap has a stored position, wherein it fits within a channel around a perimeter of the case. The wrist strap also has a deployed position, wherein the wrist strap fits around the wrist of a user to connect the case to the wrist. The wrist strap of the wrist strap assembly may or may not be removable from the case. Additionally, when the wrist strap is in its stored position within the channel, the wrist strap extends a predetermined distance above a top end of the channel to function as a bumper, which further protects the screen of a mobile device upon impact of the mobile device with the ground, if the mobile device were to be inadvertently dropped.

An example of a wrist strap assembly for a mobile device in accordance with one or more aspects of the present disclosure includes a case and a wrist strap. The case includes a bottom wall. A sidewall is disposed around a perimeter of the bottom wall and extends from the bottom wall to an upper distal end of the sidewall. The sidewall and bottom wall define an inner cavity sized to receive a mobile device therein. A channel is disposed around the upper distal end of the sidewall. The wrist strap is configured to have a stored position and a deployed position. When the wrist strap is in the stored position, the wrist strap is configured to frictionally fit within the channel of the case. When the wrist strap is in the deployed position, the wrist strap is configured to fit around the wrist of a user and to be connected to the case to secure the case to the user's wrist.

Another example of a wrist strap assembly for a mobile device in accordance with one or more aspects of the present disclosure includes a case and a wrist strap. The case includes a bottom wall. A sidewall of the case is disposed around a perimeter of the bottom wall of the case and extends from the bottom wall to an upper distal end of the sidewall. The sidewall and bottom wall define an inner cavity sized to receive a mobile device therein. A channel is disposed around the upper distal end of the sidewall. The wrist strap is configured to have a stored position and a deployed position. When the wrist strap is in the stored position, the wrist strap is configured to frictionally fit within the channel of the case and to extend a predetermined distance above the upper distal end of the sidewall of the case. When the wrist strap is in the deployed position, the wrist strap is configured to fit around the wrist of a user and to be connected to the case to secure the case to the user's wrist. A notch is positioned in the channel. The notch is operable to expose a portion of the wrist strap when the wrist strap is in its stored position. The exposed portion of the wrist strap is operable to engage with a finger of the user to pull the wrist strap from its stored position to its deployed position.

Additionally, an example is depicted of wrist strap for a wrist strap assembly for a mobile device in accordance with one or more aspects of the present disclosure. The wrist strap assembly includes a case and the wrist strap. The case includes a bottom wall, a sidewall and a channel. The sidewall is disposed around a perimeter of the bottom wall and extends from the bottom wall to an upper distal end of the sidewall. The sidewall and bottom wall define an inner cavity of the case sized to receive a mobile device therein. The channel is disposed around the upper distal end of the sidewall. The wrist strap is configured to have a stored position and a deployed position. When the wrist strap is in the stored position, the wrist strap is configured to frictionally fit within the channel of the case. When the wrist strap is in the deployed position, the wrist strap is configured to fit around the wrist of a user and to be connected to the case to secure the case to the user's wrist.

DRAWINGS

The disclosure will be more fully understood from the following detailed description taken in conjunction with the accompanying drawings, in which:

FIG. 1A depicts an example of a front perspective view of a wrist strap assembly for a mobile device, wherein a wrist strap of the wrist strap assembly is deployed around a user's wrist and attached to a case for the mobile device, according to aspects described herein;

FIG. 1B depicts an example of an enlarged view of the circle 1B of FIG. 1A, according to aspects described herein;

FIG. 1C depicts an example of an enlarged view of the circle 1C of FIG. 1A, according to aspects described herein;

Figure 7:
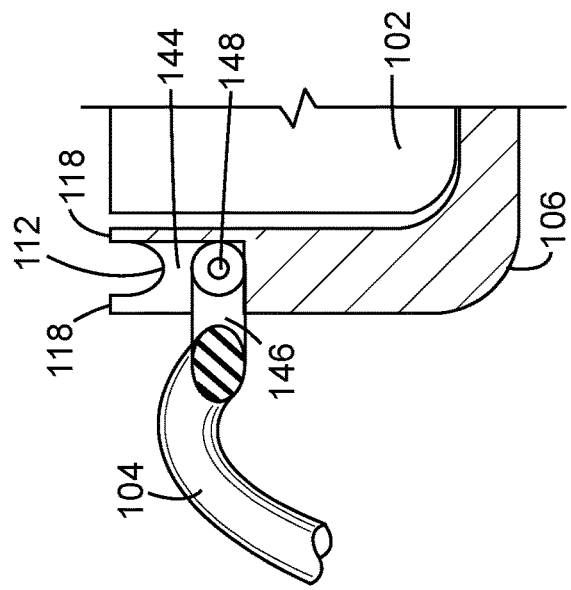
Figure 5:
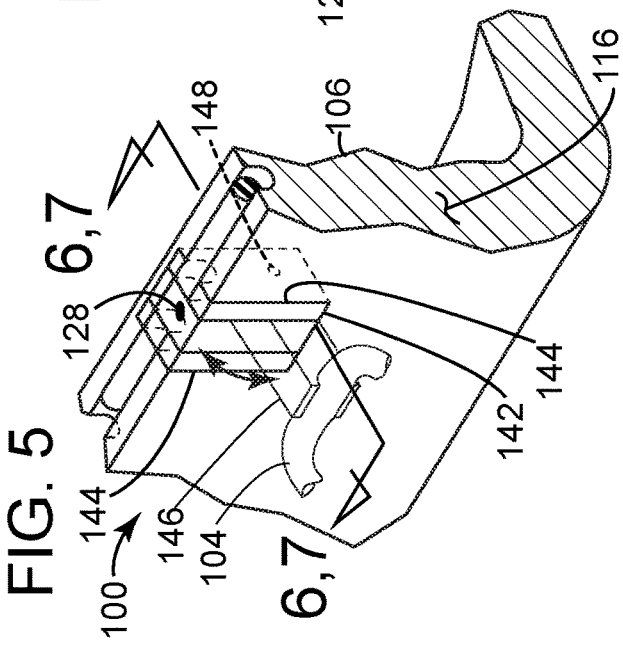
FIG. 5 depicts an example of an enlarged front perspective view of a wrist strap assembly, wherein the wrist strap is detached from the case, the wrist strap having a tab that is a hinge that frictionally fits into an open recess in the sidewall of the case, according to aspects described herein.
Figure 8:
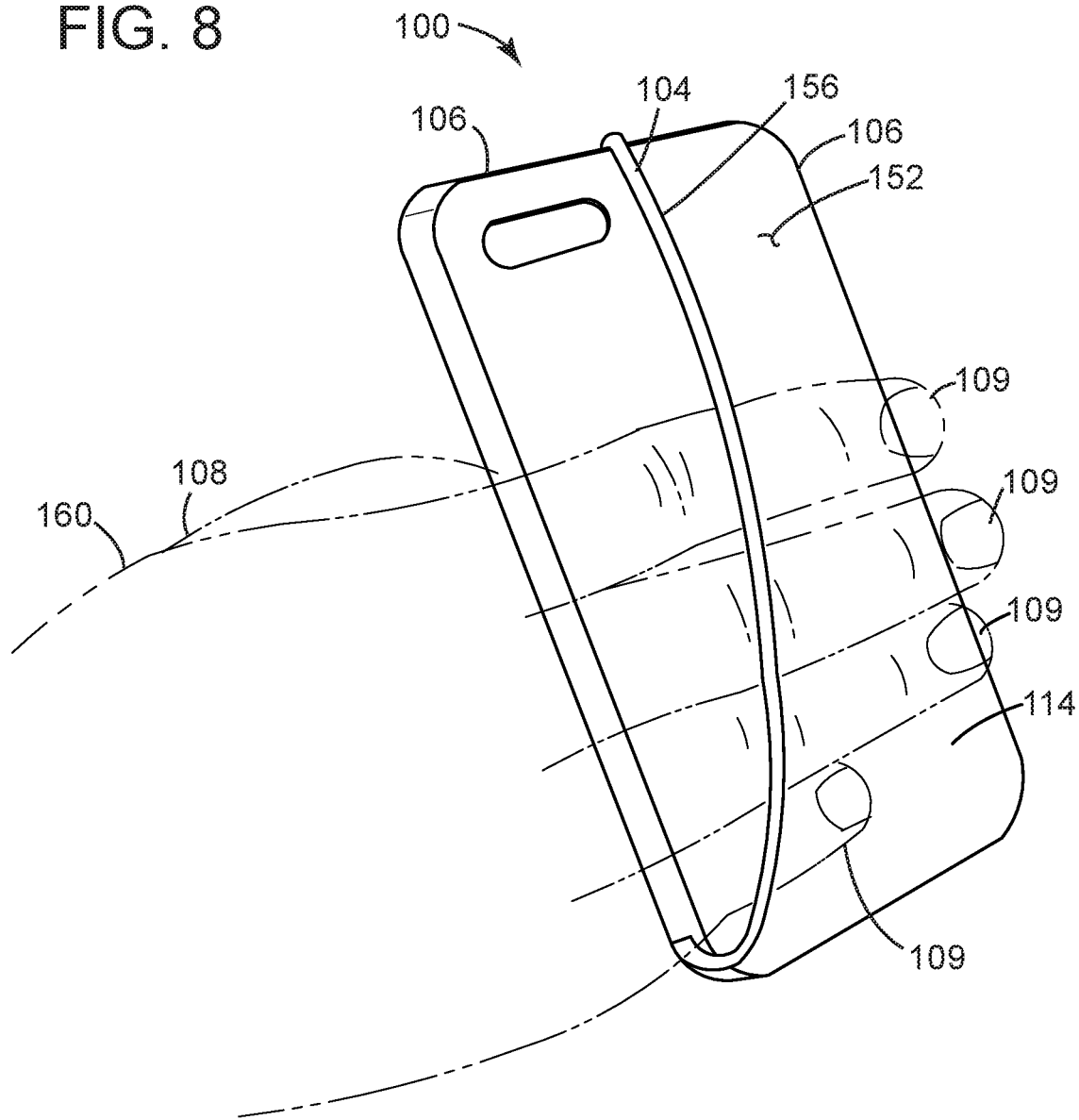

FIG. 7 depicts an example of a cross sectional view of FIG. 5 taken along the line 7-7 of FIG. 5, wherein the strap 104 is in its deployed position, according to aspects described herein; and FIG. 8 depicts an example of a perspective view of the wrist strap assembly in a partially deployed position, wherein a rear outer side of the bottom wall of the case and the wrist strap form a hand loop, in accordance with aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 2A:
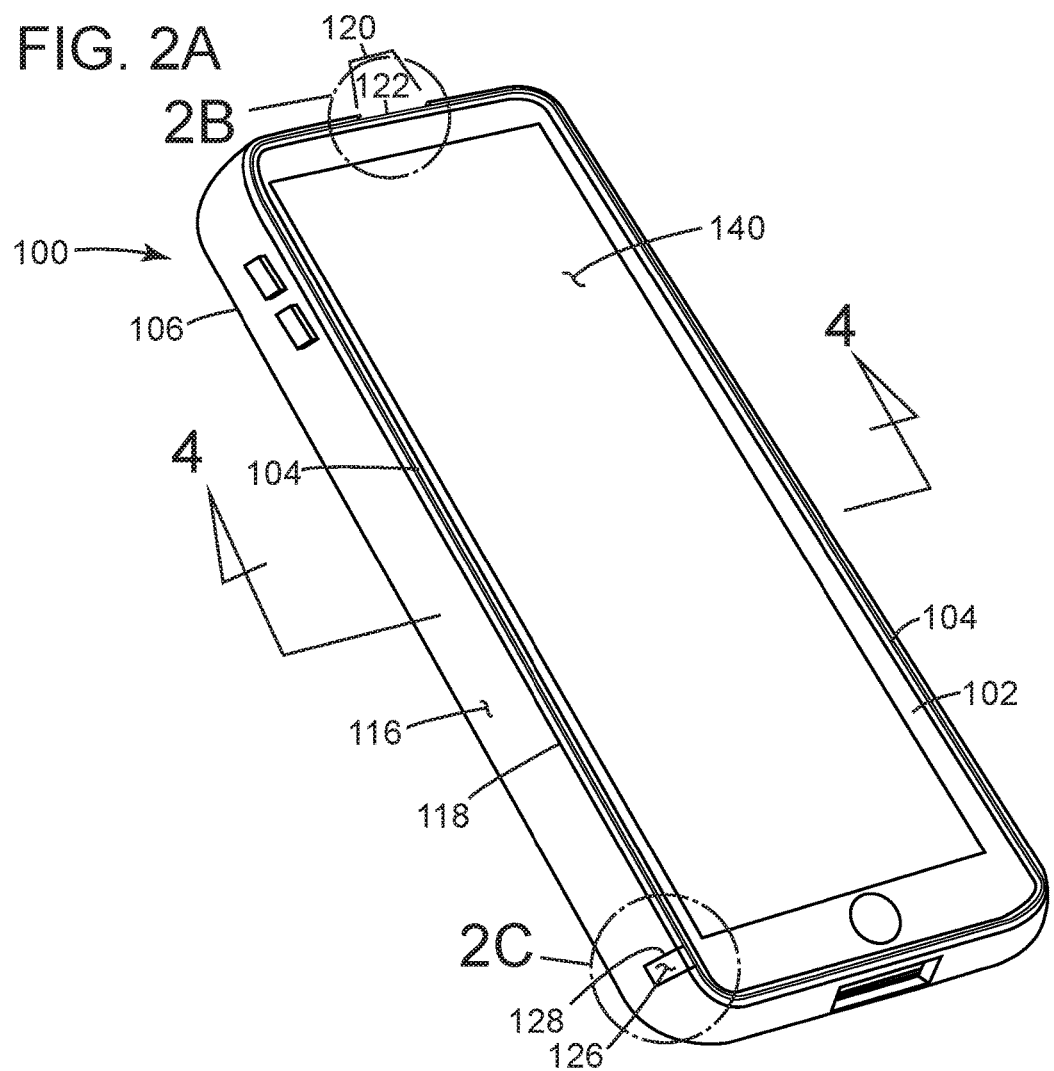
FIG. 2A depicts an example of a front perspective view of the wrist strap assembly of FIG. 1A, wherein the wrist strap of the wrist strap assembly is in a stored position, according to aspects described herein.
Figure 2B:
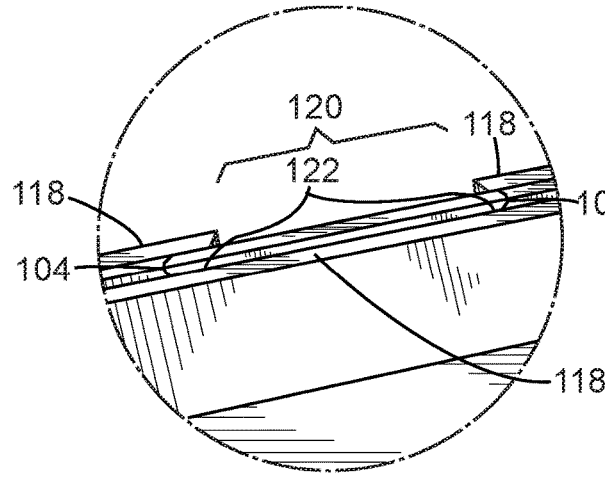
FIG. 2B depicts an example of an enlarged view of the circle 2B of FIG. 2A, according to aspects described herein.
Figure 2C:
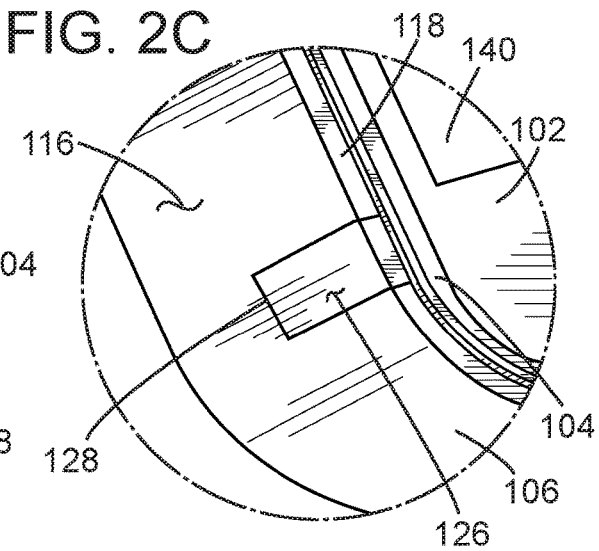
FIG. 2C depicts an example of an enlarged view of the circle 2C of FIG. 2A, according to aspects described herein.

Referring to FIGS. 1A-C and 2A-C, examples are depicted of front perspective views of a wrist strap assembly 100 for a mobile device 102 having a screen 140, wherein the wrist strap assembly 100 includes a wrist strap 104 and a case 106 for the mobile device 102. More specifically, FIG. 1A is an example of a front perspective view of the wrist strap assembly 100 with the wrist strap 104 positioned in a deployed position and FIGS. 1B and 1C are an enlarged views of the circles 1B and 1C in FIG. 1A respectively. Also, FIG. 2A is an example of a front perspective view of the wrist strap assembly 100 with the wrist strap 104 positioned in a stored position and FIGS. 2B and 2C are an enlarged views of the circles 2B and 2C in FIG. 2A respectively.

In the deployed position (FIG. 1A), the wrist strap 104 is configured to be positioned around a wrist 110 and/or hand 160 of a user 108 and attached to the case 106. In the stored position (FIG. 2A), the wrist strap 104 is configured to be disposed in a channel 112 (see FIG. 1C) of the case 106.

The case 106 of the wrist strap assembly 100 includes a bottom wall 114 (see FIG. 3) and a sidewall 116. The sidewall 116 is disposed around a perimeter of the bottom wall 114 and extends from the bottom wall 114 to an upper distal end 118 (see FIG. 1C) of the sidewall 116. The sidewall 116 and bottom wall 114 define an inner cavity 124 (see FIG. 3) sized to receive the mobile device 102 therein. The channel 112 is disposed around the upper distal end 118 of the sidewall 116. The channel 112 includes a notch 120 (see FIG. 1B) configured to expose a portion 122 (see FIG. 2B) of the wrist strap 104 such that the exposed portion 122 is accessible to be pulled by a finger 109 of the user 108.

The wrist strap 104 is configured to have a stored position (FIG. 2) and a deployed position (FIG. 3). When the wrist strap 104 is in the stored position, the wrist strap 104 is configured to frictionally fit within the channel 112 of the case 106. When the wrist strap 104 is in the deployed position (FIG. 1), the wrist strap 104 is configured to fit around the wrist 110 of the user 108 and to be connected to the case 106 to secure the case 106 to the user's wrist 110. In the examples illustrated in FIGS. 1A and 2A, the wrist strap 104 includes a tab 126 (see FIG. 2C) that is removably press fit into a recess 128 (see FIG. 2C) of the case 106.

The wrist strap assembly 100 also includes a notch 120, which is positioned in the channel 112. The notch 120 is operable to expose a portion 122 of the wrist strap 104 when the wrist strap 104 is in its stored position. The exposed portion 122 of the wrist strap 104 is operable to engage with a finger 109 of the user 108 to enable to user 108 to pull the wrist strap 104 from its stored position (FIG. 2A) to its deployed position (FIG. 1A).

The notch 120, in the example illustrated in FIG. 2A, is positioned in an upper central portion of the case 106. However, the notch 120 may be located on any portion of the channel 112 of the case 106.

Figure 4:
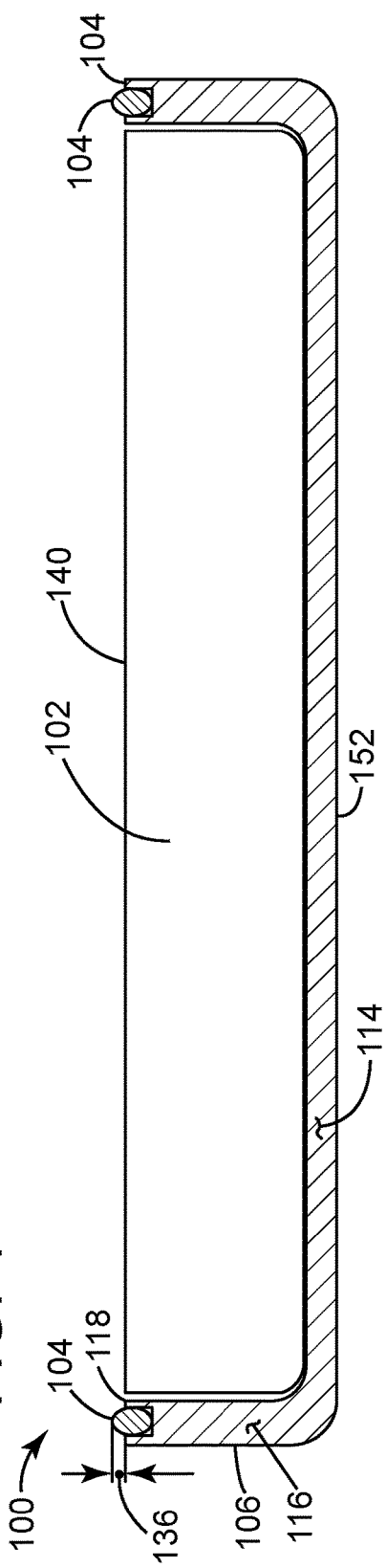
FIG. 4 depicts an example of a cross sectional side view of the wrist strap assembly of FIG. 2 taken along a line 2-2, according to aspects described herein.

As will be explained in greater detail herein, the wrist strap 104 may be removably connected to the case 106. Alternatively, the wrist strap 104 may be permanently connected to the case 106. The wrist strap may be composed of an appropriate resilient flexible material such as various types of rubber, elastomers or the like. The wrist strap may alternatively non-resilient flexible material, such as leather, various types of plastics or the like. The wrist strap may have a rectangular cross section (as illustrated in FIGS. 1A and 2A, may have a circular cross section (as illustrated in FIG. 4) or may have any other appropriate cross-sectional shape.

Figure 3A:
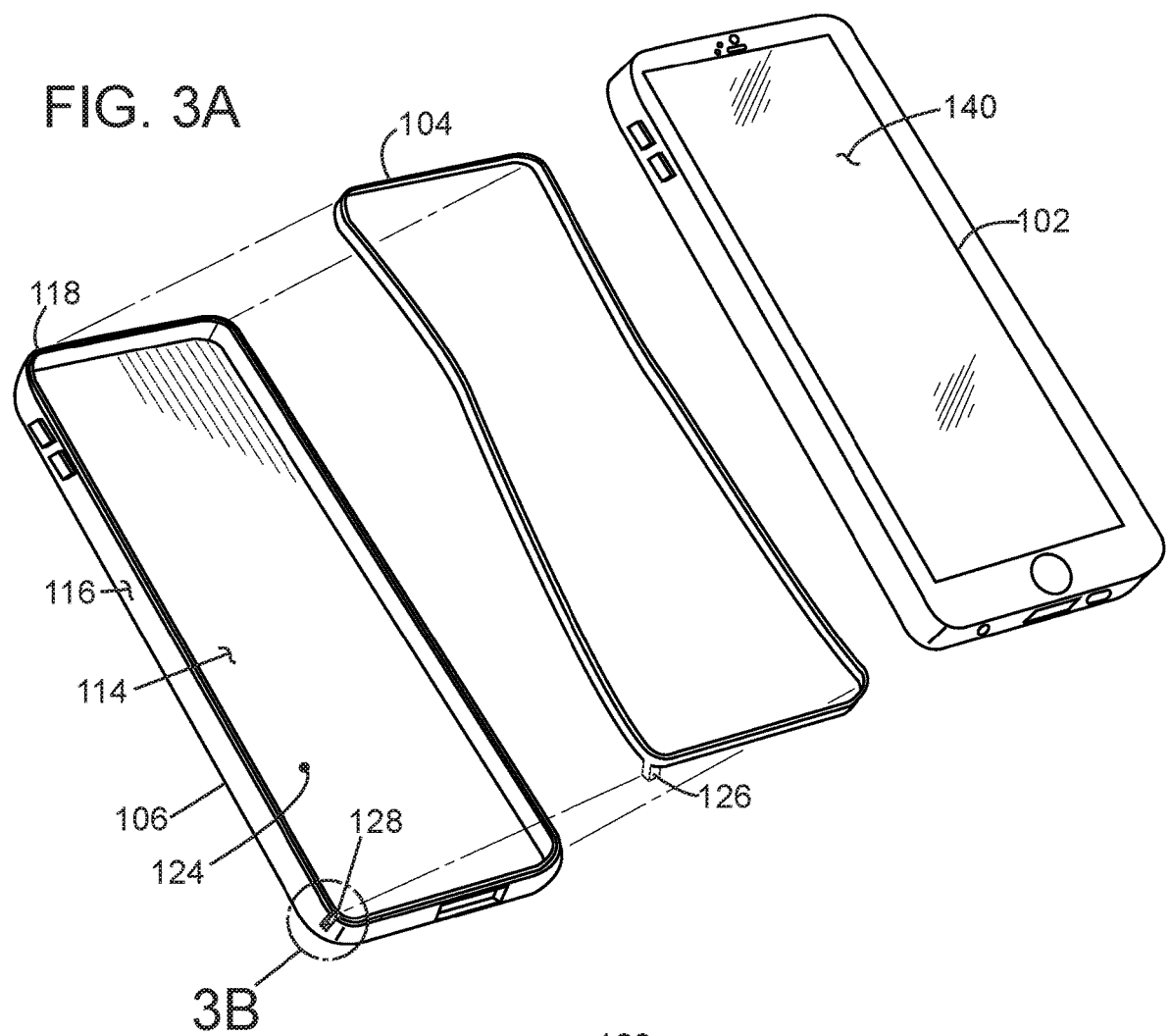
FIG. 3A depicts an example of an exploded view of the wrist strap assembly of FIG. 1A, wherein the wrist strap is detached from the case, the wrist strap having a tab that is connectable to a recess in a sidewall of the case, according to aspects described herein.
Figure 3B:
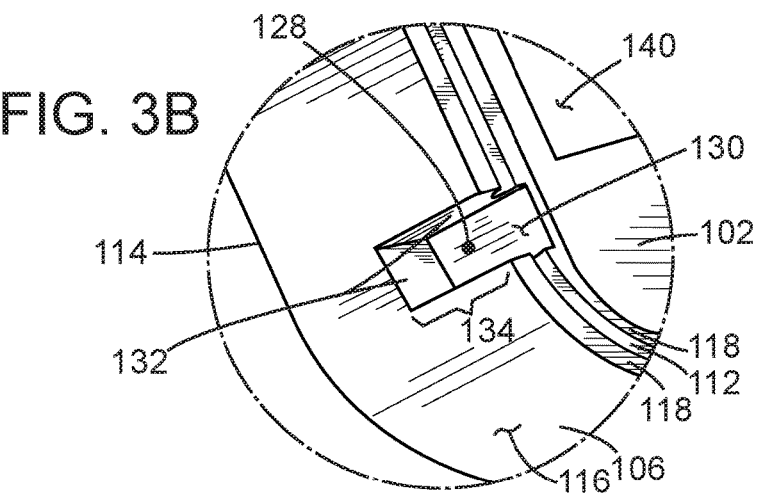
FIG. 3B depicts an example of an enlarged view of the circle 3B of FIG. 3A, according to aspects described herein.

Referring to FIGS. 3A and 3B, an example is depicted of an exploded view (FIG. 3A) of the wrist strap assembly 100 and an enlarged view (FIG. 3B) of the circle 3B in FIG. 3A. As can be more readily seen in FIG. 3A, the sidewall 116 of the case 106 is disposed around a perimeter of the bottom wall 114 and extends upwards from the bottom wall 114 to the upper distal end 118 of the sidewall 116. The sidewall 116 and bottom wall 114 define the inner cavity 124 of the case 106. The inner cavity 124 is sized to receive and conform to the mobile device 102, which is disposed therein.

In the example illustrated in FIG. 3A, the wrist strap 104 is detached from the case 106. Further the wrist strap 104 is removably connectable to the case. This can be done in several ways. For example, the wrist strap 104 may have a tab 126 that is connectable to a recess 128 in the sidewall 116 of the case 106. The tab 126 may be configured to frictionally fit within the recess 128 to secure the wrist strap 104 to the case 106. The tab 126 may be composed of the same material as the wrist strap 104. Alternatively, the tab 126 may be composed of a different, less flexible material than the wrist strap 104 in order to enhance the friction fit within the recess 128.

The recess 128 may include a rear wall 130 (see FIG. 3B) that is indented into the side wall 116 of the case 106. The rear wall 130 of the recess 128 may extend from a lower portion of the side wall 116 to the upper distal end 118 of the side wall 116 of the case 106. The recess 128 may also include a perimeter wall 132 disposed around the rear wall 130. The perimeter wall 132 may extend forward from the rear wall 130 to form a recess side opening 134 in the sidewall 116 of the case 106. The perimeter wall 132 may engage the edges of the tab 126 to provide the friction fit that secures the tab 126 within the recess 128.

The recess 128 is illustrated in FIGS. 3A and 3B as being located in one of the lower corner (left or right) of the sidewall 116 of the case 106. However, the recess 128 may be located anywhere along the perimeter of the sidewall 116.

Though the wrist strap 104 is illustrated in FIG. 3A as being removably attached to the case 106 by press fitting a tab 126 of the wrist strap 104 into a recess 128 of the sidewall 116, other configurations of the strap and case may be used to removably attach the wrist strap to the case. For example, the case 106 may have a thru-hole (not shown) on its sidewall 116 that is configured to receive a key ring (not shown). The key ring may be slid though the thru-hole and the wrist strap to secure the wrist strap to the case.

Alternatively, the wrist strap 104 may be permanently attached to the case 106. For example, the tab 126 of the wrist strap 104 may be riveted or bonded to the sidewall 116 of the case 106.

Referring to FIG. 4, an example is depicted of a cross sectional side view of the wrist strap assembly 100 taken along the line 4-4 of FIG. 2B. As illustrated in the example of FIG. 4, when the wrist strap 104 is in the stored position, the wrist strap 104 may be configured to extend a predetermined distance 136 above the upper distal end 118 of the sidewall 116 of the case 106.

In this configuration, the wrist strap 104 advantageously functions as a bumper, which helps to protect the screen 140 of the mobile device 102 from damage upon impact of the mobile device 102 with the ground, if the mobile device 102 were to be inadvertently dropped. Damage from such impacts may be greatly reduced, especially if the wrist strap 104 is composed of a resilient material that can effectively act as a shock absorber.

Referring to FIG. 5 an example is depicted of an enlarged front perspective view of the wrist strap assembly 100, wherein the wrist strap 104 is detached from the case 106. In this example, the tab 126 of the wrist stab 104 is configured as a hinge 142 that is frictionally fit into the recess opening 134 of recess 128 in the sidewall 116 of the case 106.

The hinge 142 includes two side plates 144 on opposing sides of a middle plate 146. The side plates and middle plate are pivotally connected together via a pin 148, which extends though bottom end portions of the plates 144, 146. The middle plate 146 is connected to the wrist strap 104, for example, with a rivet or screw (not shown).

The hinge 142 is sized to press fit into the recess side opening 134 (see FIG. 3B) and abut against the recess rear wall 130 (see FIG. 3B) while the recess perimeter wall 132 (see FIG. 3B) frictionally secures the hinge side plates 144 within the recess 128.

Figure 6:
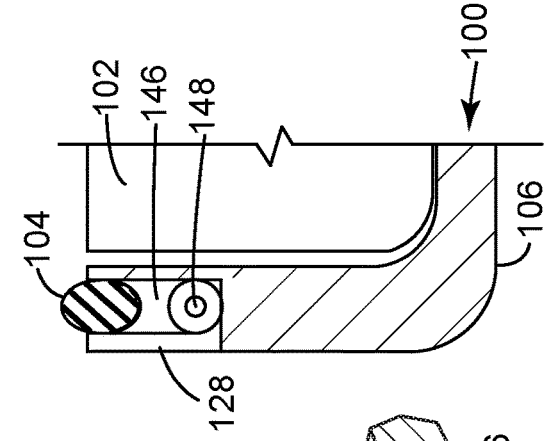
FIG. 6 depicts an example of a cross sectional view of FIG. 5 taken along the line 6-6 of FIG. 5, wherein the strap 104 is in its stored position, according to aspects described herein.

Referring to FIG. 6, an example is depicted of a cross sectional view of FIG. 5 taken along the line 6-6 of FIG. 5, wherein the strap 104 is in its stored position. When the wrist strap 104 is in the stored position, the middle plate 146 of the hinge 142 is positioned within the recess 128 between, and substantially parallel to, the two side plates 144.

Referring to FIG. 7, an example is depicted of a cross sectional view of FIG. 5 taken along the line 7-7 of FIG. 5, wherein the wrist strap 104 is in its deployed position. When the wrist strap 104 is in its deployed position, the middle plate 146 of the hinge 142 is pivotable to a position that is substantially perpendicular to the two side plates 144.

Referring to FIG. 8, an example is depicted of a perspective view of the wrist strap assembly 100 in a partially deployed position, wherein a rear outer side 152 of the bottom wall 114 of the case 106 and the wrist strap 104 form a hand loop, in accordance with aspects described herein. In this partially deployed position, a first portion (not shown) of the wrist strap 104 is positioned partially in the channel 112. A second portion 156 of the wrist strap 104 extends from opposing sides of the channel 112 around the rear outer side 152 of the bottom wall 114 of the case 106. The second portion 156 of the wrist strap 104 and the rear outer side 152 of the bottom wall 114 of the case 106 form a hand loop. The hand loop is configured to receive four fingers of a hand 160 of the user 108, when the user 108 is holding the case 106.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A wrist strap assembly for a mobile device, the wrist strap assembly comprising:
   a case comprising:
      a bottom wall,
      a sidewall disposed around a perimeter of the bottom wall and extending from the bottom wall to an upper distal end of the sidewall, the sidewall and bottom wall defining an inner cavity sized to receive a mobile device therein, and
      a channel disposed around the upper distal end of the sidewall; and
   a wrist strap configured to have a stored position and a deployed position, wherein:
      when the wrist strap is in the stored position, the wrist strap is configured to frictionally fit within the channel of the case, and
      when the wrist strap is in the deployed position, the wrist strap is configured to fit around the wrist of a user and to be connected to the case to secure the case to the user's wrist.

2. The wrist strap assembly of claim 1 wherein, when the wrist strap is in the stored position, the wrist strap is configured to extend a predetermined distance above the upper distal end of the sidewall of the case.

3. The wrist strap assembly of claim 1, comprising:
A recess disposed in the sidewall of the case; and
a tab disposed on the wrist strap, the tab configured to frictionally fit within the recess to secure the wrist strap to the case.

4. The wrist strap assembly of claim 2, wherein the tab is composed of the same material as the wrist strap.

5. The wrist strap assembly of claim 2, comprising:
the recess comprising:
   a rear wall indented into the side wall of the case and extending from a lower portion of the side wall to the upper distal end of the side wall,
   a perimeter wall disposed around the rear wall, the perimeter wall extending forward from the rear wall to form a recess side opening in the sidewall of the case; and
the tab comprising a hinge, the hinge comprising:
   two side plates on opposing sides of a middle plate, the side plates and middle plate pivotally connected together via a pin, the middle plate being connected to the wrist strap, and
   the hinge being sized to press fit into the recess side opening and abut against the recess rear wall while the recess perimeter wall frictionally secures the hinge side plates within the recess;
wherein, when the wrist strap is in the stored position, the middle plate of the hinge is positioned within the recess between, and substantially parallel to, the two side plates, and
wherein, when the wrist strap is in the deployed position, the middle plate of the hinge is pivotable to a position that is substantially perpendicular to the two side plates.

6. The wrist strap assembly of claim 1, comprising a notch positioned in the channel, the notch operable to expose a portion of the wrist strap when the wrist strap is in its stored position, the exposed portion of the wrist strap being operable to engage with a finger of the user to pull the wrist strap from its stored position to its deployed position.

7. The wrist strap assembly of claim 6, wherein the notch is positioned in an upper central portion of the case.

8. The wrist strap assembly of claim 1, comprising the wrist strap configured to have a partially deployed position, wherein when the wrist strap is in the partially deployed position:
   a first portion of the wrist strap is positioned partially in the channel; and
   a second portion of the wrist strap extends from opposing sides of the channel around the rear outer side of the bottom wall of the case;
wherein, the second portion of the wrist strap and the rear outer side of the bottom wall of the case form a hand loop, the hand loop being configured to receive four fingers of a hand of the user, when the user is holding the case.

9. The wrist strap assembly of claim 1, wherein the wrist strap is removably connected to the case.

10. The wrist strap assembly of claim 1, wherein the wrist strap is permanently connected to the case.

11. A wrist strap assembly for a mobile device, the wrist strap assembly comprising:
a case comprising:
   a bottom wall,
   a sidewall disposed around a perimeter of the bottom wall and extending from the bottom wall to an upper distal end of the sidewall, the sidewall and bottom wall defining an inner cavity sized to receive a mobile device therein, and
   a channel disposed around the upper distal end of the sidewall;
a wrist strap configured to have a stored position and a deployed position, wherein:
   when the wrist strap is in the stored position, the wrist strap is configured to frictionally fit within the channel of the case and to extend a predetermined distance above the upper distal end of the sidewall of the case, and
   when the wrist strap is in the deployed position, the wrist strap is configured to fit around the wrist of a user and to be connected to the case to secure the case to the user's wrist; and
a notch positioned in the channel, the notch operable to expose a portion of the wrist strap when the wrist strap is in its stored position, the exposed portion of the wrist strap being operable to engage with a finger of the user to pull the wrist strap from its stored position to its deployed position.

12. The wrist strap assembly of claim 11, comprising:
A recess disposed in the sidewall of the case; and
a tab disposed on the wrist strap, the tab configured to frictionally fit within the recess to secure the wrist strap to the case.

13. The wrist strap assembly of claim 12, wherein the recess is positioned in one of the lower left corner of the case or the lower right corner of the case.

14. The wrist strap assembly of claim 12, wherein the tab is composed of the same material as the wrist strap.

15. The wrist strap assembly of claim 12, comprising:
the recess comprising:
   a rear wall indented into the side wall of the case and extending from a lower portion of the side wall to the upper distal end of the side wall,
   a perimeter wall disposed around the rear wall, the perimeter wall extending forward from the rear wall to form a recess side opening in the sidewall of the case; and
the tab comprising a hinge, the hinge comprising:
   two side plates on opposing sides of a middle plate, the side plates and middle plate pivotally connected together via a pin, the middle plate being connected to the wrist strap, and
   the hinge being sized to press fit into the recess side opening and abut against the recess rear wall while the recess perimeter wall frictionally secures the hinge side plates within the recess;
wherein, when the wrist strap is in the stored position, the middle plate of the hinge is positioned within the recess between, and substantially parallel to, the two side plates, and
wherein, when the wrist strap is in the deployed position, the middle plate of the hinge is pivotable to a position that is substantially perpendicular to the two side plates.

16. The wrist strap assembly of claim 11, comprising the wrist strap configured to have a partially deployed position, wherein when the wrist strap is in the partially deployed position:
   a first portion of the wrist strap is positioned partially in the channel; and
   a second portion of the wrist strap extends from opposing sides of the channel around the rear outer side of the bottom wall of the case;

wherein, the second portion of the wrist strap and the rear outer side of the bottom wall of the case form a hand loop, the hand loop being configured to receive four fingers of a hand of the user, when the user is holding the case.

17. The wrist strap assembly of claim 11, wherein the wrist strap is removably connected to the case.

18. The wrist strap assembly of claim 11, wherein the wrist strap is permanently connected to the case.

\* \* \* \* \*